June 14, 1932.  J. B. BRADFORD  1,863,038
LAWN MOWER SHARPENER
Filed Nov. 7, 1928
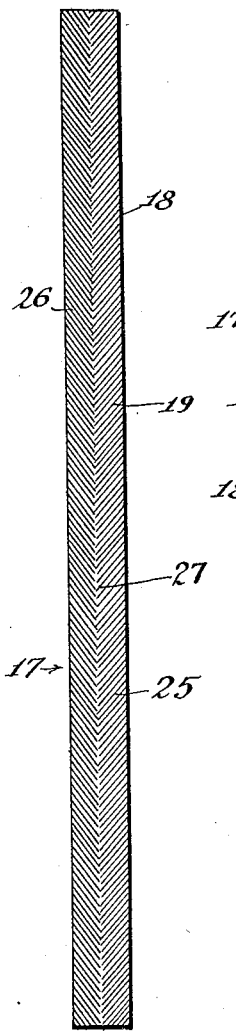
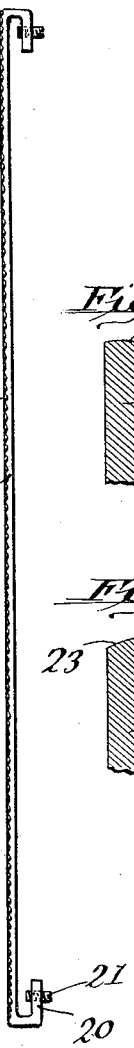
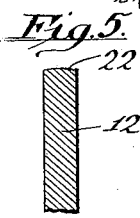
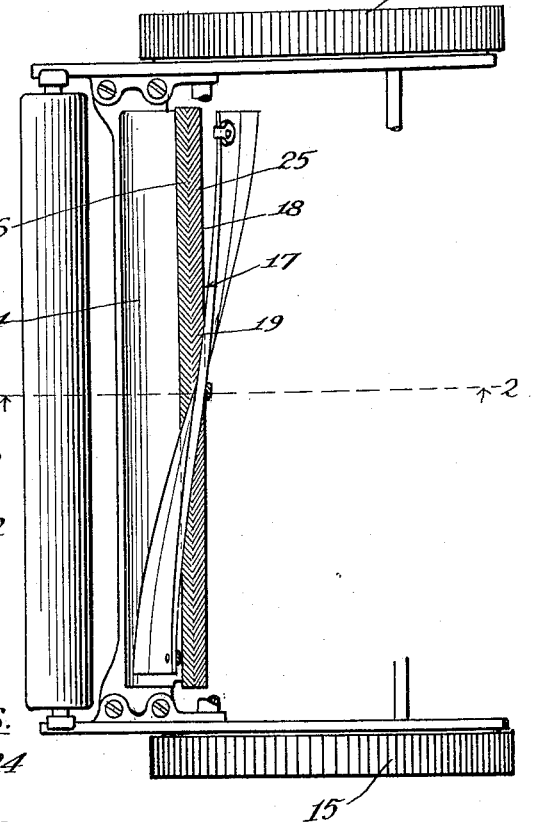
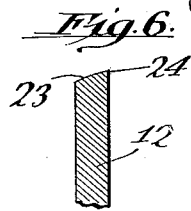
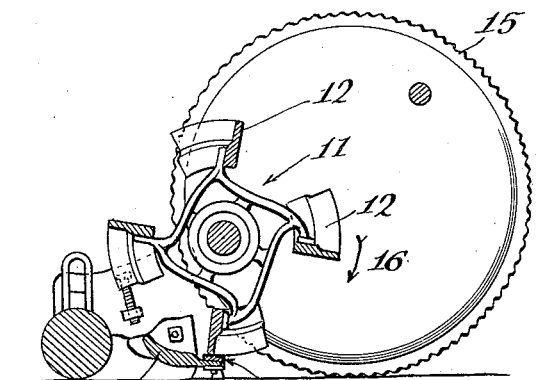
Inventor
John B. Bradford
by Hazard and Miller
Attorneys.

Patented June 14, 1932

1,863,038

UNITED STATES PATENT OFFICE

JOHN B. BRADFORD, OF LOS ANGELES, CALIFORNIA, ASSIGNOR OF ONE-HALF TO CHARLES J. HEYLER, OF LOS ANGELES, CALIFORNIA

LAWN MOWER SHARPENER

Application filed November 7, 1928. Serial No. 317,789.

My invention is a longitudinal lawn mower sharpener and method of sharpening lawn mowers.

It is an object of this invention to provide a flat file for the sharpening of the revolving blades of a lawn mower. The file is provided with two sets of teeth disposed in opposite directions from a longitudinal median line. Means are provided for detachably securing the file to the fixed blade of the lawn mower, said means permitting the file to be reversed so that the file teeth adjacent the edge of the stationary blade may run in one direction or the other. By making the file reversible in this manner the blades of a lawn mower may be sharpened irrespective of the curvature of the blades, that is to say, whether the edge of the revolving blade passes over the file teeth from right to left or vice versa.

My invention involves a simple structure and simple operations, in which the fixed cutting blade is slightly lower so that a flat file may be attached thereto on the upper side of the fixed blade. This is then adjusted so as to contact with the rotary cutting blades and the longitudinal mower is operated so that the ground wheels rotate the rotary cutters and these in sweeping over the file, grind the cutting edges.

This grinding action as so far described, does not give a good cutting edge when the fixed blade is adjusted to engage the rotary blades and in order to remedy this I utilize a hand file and give a relief cut on the rear edge of the cutting blades.

My invention is illustrated in the accompanying drawing, in which:

Figure 1 is a plan of the lawn mower with the fixed file on the fixed blade;

Fig. 2 is a vertical section on the line 2—2 of Fig. 1 in the direction of the arrows;

Fig. 3 is a plan view of the fixed file;

Fig. 4 is an edge view of the fixed file;

Fig. 5 is an enlarged partial section of one of the rotary cutting blades, after the first grinding operation;

Fig. 6 is a view similar to Fig. 5 after the blades have been given a relief filing.

Referring first particularly to Figs. 1 and 2, the lawn mower is illustrated with the rotary blade holder 11 having the rotary cutting blades 12. These blades coact against the fixed blade 13 mounted on an adjustably fixed blade holder 14. The lawn mower is illustrated as driven in the usual way through the medium of the ground wheels 15 and in the cutting operation the cutting blades rotate in a clockwise direction as illustrated by the arrow 16 of Fig. 2.

A flat file 17 is illustrated as being constructed of a flat bar 18 with filing teeth 19 on its upper surface. This bar has the ends with the reverse bend as illustrated at 20 and set screws 21 extend through these reverse bends and engage underneath the ends of the fixed cutting blade 13. The file is made of sufficient length so that it readily fits over the ends of the fixed cutting blade and when clamped to the set screws, the filing part of the bar 18 is firmly supported for its full length on the fixed cutting blade.

The lawn mower is then operated by rotating the ground wheels 15, which is preferably done by rolling the lawn mower over the ground and it may be tilted in the reverse direction so that the blades will not operate on the grass. Therefore the rotating action of the cutting blades against the file, files these blades, giving them a continuous edge of the same curvature from end to end and with the same degree of filing.

The blades when filed by the first filing operation have a cylindrical edge 22 due to the blades describing a cylindrical motion and in their rotation contacting with the fixed file. This cylindrical surface does not present a good cutting edge with the fixed blade, therefore I use a hand file and give a relief as indicated at numeral 23 in Fig. 6 to the rotary cutting blades so that substantially the edge 24 acts as a cutting edge with the fixed blade.

As it is desirable that the rotary blades when turning have a type of shearing action against the file and operate against the file teeth from one end to the other, it is necessary to have file surfaces which will accommodate the different types of cutting blades. Some lawn mowers have the blades arranged to contact first with the fixed blade on the right hand side of the machine and sweep the shearing cut to the left side, and others are made vice versa. Therefore instead of requiring the use of two files for what may be termed right and left hand types of blades, I form the file with the cutting teeth extending from opposite edges of the blade toward the center. Thus as illustrated in Fig. 3, the file teeth 25 for filing blades, sweeping from say the right to the left, extend inwardly from one edge of the file and the file teeth 26 for operating on the reverse type of blades, extend inwardly from the other edge of the blade. These file teeth have their apices on substantially the center line 27. The filing action of the files takes place on substantially the forward half of the file adjacent the cutting edge of the fixed cutting blade.

The file 17 may be reversed on the fixed cutting blade 13. The lawn mower illustrated in Figures 1 and 2 shows revolving cutting blades 12 curved in a manner so that the right hand side, considered from the view of the operator, contacts with the file first and the filing action is from right to left. Some lawn mowers have the revolving cutting blades revolve in the other direction. It is, therefore, desirable to have the teeth of the file curved in the opposite direction, which the construction of my file makes possible. All that is necessary is to reverse the file so that the right hand end is positioned at the left hand end and vice versa. In this manner my sharpening attachment will accommodate either a right handed or left handed lawn mower.

Various changes may be made in the principles of my invention without departing from the spirit thereof, as set forth in the description, drawing and claims.

I claim:

1. A sharpener for lawn mowers, comprising a flat bar having file teeth on its upper surface and end portions having a reverse bend on the underside of the bar with screw devices extending through said ends from underneath, the said bar being adapted to fit on a stationary blade of the lawn mower with the bent ends engaging over the ends of said blade, the upper surface of the said bar being adapted to engage the rotary blades of the lawn mower, said file teeth being inclined on one side to one edge and on the opposite side to the opposite edge in a reverse direction whereby the upper surface of the bar may be optionally positioned to have its teeth to run in either direction to engage the rotary blades of either a right hand or left hand mower respectively.

2. A sharpener for lawn mowers comprising a flat bar having file teeth on its upper surface, said teeth being inclined on one side to one edge and on the opposite side to the opposite edge in a reverse direction, means to secure said bar to a stationary blade of a lawn mower interchangeably at opposite ends of the stationary blade whereby the upper surface of the bar may be optionally positioned to have its teeth run in either direction to engage the rotary blades of a right hand or left hand mower respectively.

In testimony whereof I have signed my name to this specification.

JOHN B. BRADFORD.